(12) United States Patent
Lee

(10) Patent No.: US 8,611,582 B2
(45) Date of Patent: Dec. 17, 2013

(54) SINGLE PIECE EARLOOP WITH CORRESPONDING PIVOT POST

(75) Inventor: Barry J Lee, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 870 days.

(21) Appl. No.: 12/339,936

(22) Filed: Dec. 19, 2008

(65) Prior Publication Data

US 2010/0158602 A1  Jun. 24, 2010

(51) Int. Cl.
*H04R 1/10* (2006.01)

(52) U.S. Cl.
USPC ............................................. 381/381

(58) Field of Classification Search
USPC ......... 381/381, 370–371, 374, 376, 379, 380, 381/382, 384, 328, 329
See application file for complete search history.

(56) References Cited

U.S. PATENT DOCUMENTS 7,609,845 B2 * 10/2009 Chang ........................... 381/381
2007/0223765 A1 * 9/2007 Wang ............................. 381/374

* cited by examiner

*Primary Examiner* — Hoa B Trinh
(74) *Attorney, Agent, or Firm* — Jurgen Vollrath

(57) ABSTRACT

In an earloop headset or earphone or other ear-mounted audio device, a housing is attached to an earloop by providing a ball and complementary socket arrangement between the earloop and a pivot post secured to the housing. The earloop or pivot post are made of an elastomeric material to allow the earloop and pivot post to each be made of a single piece of material and be clipped into engagement after manufacture.

17 Claims, 2 Drawing Sheets

SINGLE PIECE EARLOOP WITH CORRESPONDING PIVOT POST

FIELD OF THE INVENTION

The present invention relates to ear-mounted audio devices such as earphones and headsets. In particular it relates to ear-mounted audio devices equipped with earloops for wearing on users' ears.

BACKGROUND OF THE INVENTION

In order to reduce their size and bulkiness, headsets have been adapted such that they are suspended from or attached to users' earlobes by including loops (called earloops) attached to a housing that houses the headset's microphone and/or audio driver. In order to ensure a high degree of versatility, the earloop-housing connection is typically provided with freedom of movement to allow the housing not only to rotate relative to the earloop but also to pivot transversely to the direction of rotation. The microphone and/or audio driver of the headset or earphone (as appropriate) is typically coupled to a sound source and/or sound sink, which may be a cellular phone, MP3 player or other sound device by wires or wirelessly, e.g., via a Bluetooth® connection.

The problem with current earloops is the considerable number of parts, typically 4 to 5 elements that are involved in defining the loop and the microphone housing in order to ensure the degrees of movement discussed above. It will be appreciated that this increases not only the capital expenditure and cost of manufacture by requiring a large number of individual parts to be manufactured, e.g. by molding the pieces using individually designed molds, but also increases the time and cost of assembly.

The present invention seeks to address this issue by providing an earloop and housing connection (also referred to herein as the pivot post) with fewer parts.

SUMMARY OF THE INVENTION

According to one aspect of the invention, there is provided an earloop and pivot post arrangement for an ear-mounted audio device such as an earloop headset or earphone, comprising an earloop made from a single piece of material and a pivot post made from a single piece of material, one of the earloop and pivot post including a ball arrangement and the other of the earloop and pivot post including a socket shaped to complementarily receive the ball arrangement. Preferably at least one of the socket and ball arrangement is made from an elastomeric material. The ball arrangement may include a ball with a lip extending tangentially from the ball. The lip may have a substantially rectangular shape with the short sides being rounded. The socket may be defined by a pair of opposite low side walls with concave inner surface and a pair of opposite high side walls with concave inner surface, the high walls being higher than the low walls and defining a convex upper surface. The inner surfaces of the low and high walls are typically shaped to complementarily receive the convex outer surface of the ball, thus requiring elastomeric deformation of the ball or socket in order for the ball to be received in the socket. The height of the high side walls is preferably chosen so that the low ends of the convex surface extend to below the lip height of the ball arrangement when the ball arrangement is partially inserted into the socket from below. The height of the apex of the convex upper surface of the high side walls is preferably chosen to engage with the lower surface of the lip when the ball arrangement is fully received in the socket.

Further, according to one aspect of the invention there is provided an earloop, comprising a loop and a socket or ball arrangement at one end of the loop, the loop and socket or ball arrangement being made of a single piece of material, e.g., molded plastics material, which may be an elastomeric material. In the case of a ball arrangement, the ball arrangement may include a ball with a lip extending tangentially from the ball. The lip may have a substantially rectangular shape with the short sides being rounded. In the case of a socket, the socket may be defined by a pair of opposite low side walls with concave inner surface and a pair of opposite high side walls with concave inner surface, the high walls being higher than the low walls and defining a convex upper surface. The inner surfaces of the low and high walls are typically shaped to complementarily receive the convex outer surface of a complementarily sized ball, thus requiring elastomeric deformation of the ball or socket in order for the ball to be received in the socket.

Still further, according to one aspect of the invention there is provided a housing for an earloop headset or earphone or other ear-mounted audio device, comprising a housing having a pivot post extending from the housing, the pivot post including socket or ball arrangement, the socket or ball arrangement being made of a single piece of material, e.g., molded plastics material, which may be an elastomeric material. In the case of a ball arrangement, the ball arrangement may include a ball with a lip extending tangentially from the ball. The lip may have a substantially rectangular shape with the short sides being rounded. In the case of a socket, the socket may be defined by a pair of opposite low side walls with concave inner surface and a pair of opposite high side walls with concave inner surface, the high walls being higher than the low walls and defining a convex upper surface. The inner surfaces of the low and high walls are typically shaped to complementarily receive the convex outer surface of a complementarily sized ball, thus requiring elastomeric deformation of the ball or socket in order for the ball to be received in the socket.

DETAILED DESCRIPTION OF THE INVENTION

Figure 1:
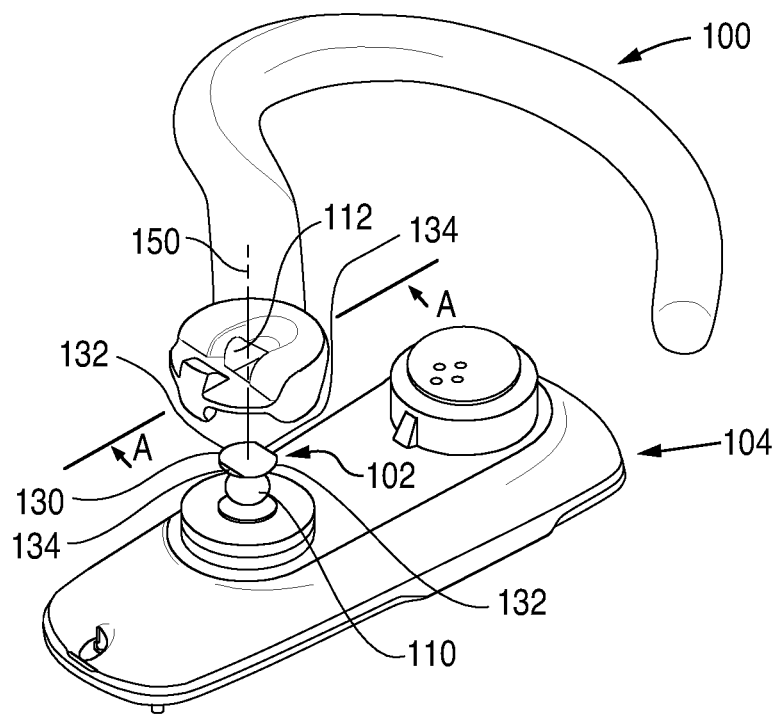
FIG. 1 is a three dimensional view of an earloop and pivot post arrangement according to one embodiment of the invention.
Figure 2:
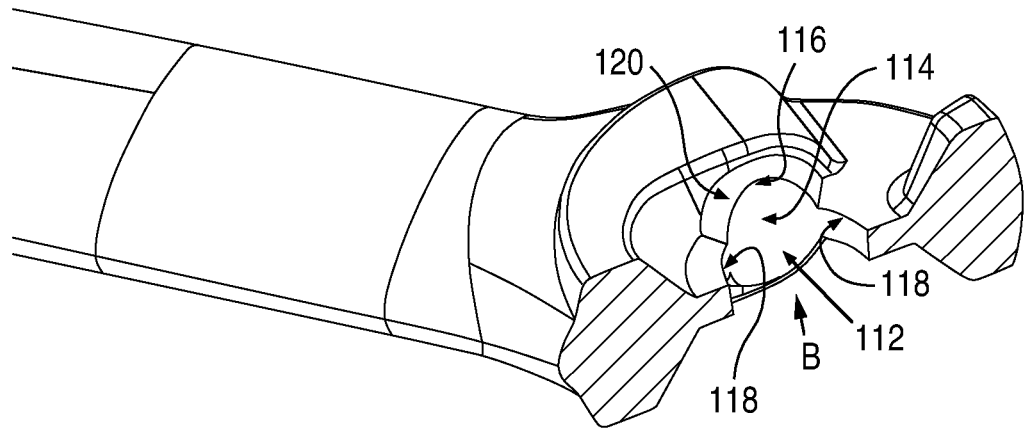
FIG. 2 shows a cross section through the earloop in FIG. 1 along the line A-A.

One embodiment of the earloop 100 and pivot post 102 arrangement of the invention is shown in FIG. 1. FIG. 1 also shows part of a housing 104 for housing a microphone and/or audio driver (not shown). The earloop 100 is made from a single piece of material. In this case, the earloop 100 is molded from a single piece of elastomeric material, e.g., a moldable plastics material. The pivot post 102 is also molded from a single piece of material, in this case, also a moldable plastics material, which may be of the same type or a different type of plastics material to that used for the earloop 100. In order to allow the earloop 100 and pivot post 102 to be rotatably and pivotably connected the present embodiment provides for a ball and socket arrangement in which the pivot post 102 is provided with a ball 110 and the earloop 100 is provided with a complementarily shaped socket 112 that receives the ball 110 in a manner discussed in greater detail below. FIG. 2 shows a section through the earloop 100 along the line A-A in FIG. 1. As can be seen in FIG. 2, the socket 112 defines a concave surface 114 in which the ball 100 of the pivot post is received. The socket 112 provides a higher wall 116 (one of which is shown in FIG. 2) on two opposing sides of the socket 112, and two lower walls or retaining rims 118 between the higher walls 116, and again facing each other in opposing fashion. In particular, the higher walls 116 define a bowed or convex upper surface 120 on which a retaining lip on the ball of the pivot post rides up during assembly, as is discussed in greater detail below.

Figure 3:
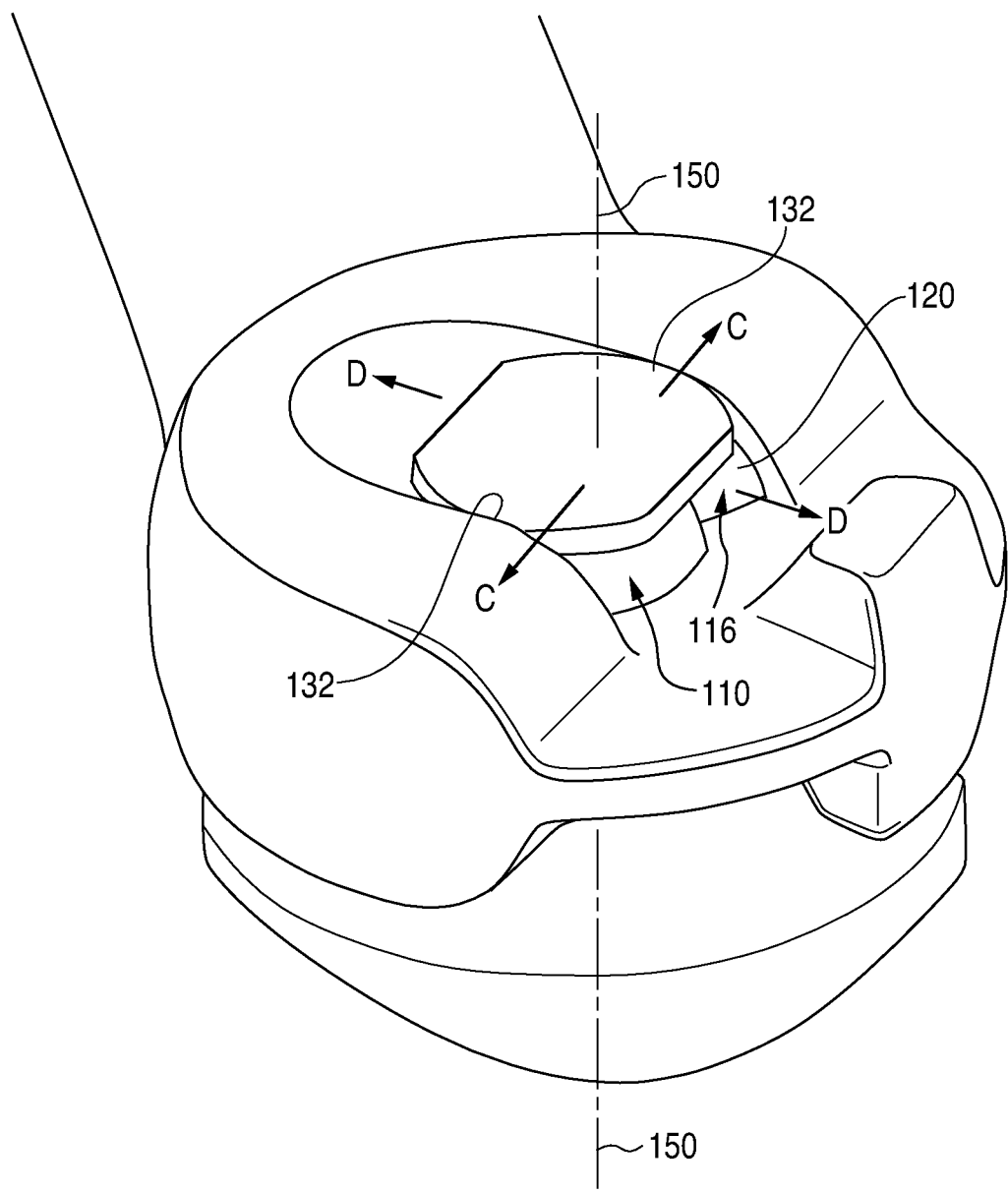
FIG. 3 is a three dimensional view of the earloop and pivot post of FIG. 1 connected to each other.

Referring again to FIG. 1, it will be seen that the pivot post 102 includes a retaining lip 130 on top of the ball 110. The retaining lip 130 has a substantially rectangular configuration with rounded short ends 132 and flat, parallel long ends 134. For ease of understanding the movement of the earloop about its axis 150 will be referred to herein as rotation while a tilting of the earloop relative to this axis 150 will be referred to as tilting. During assembly the earloop 100 is connected to the pivot post 102 by rotating the earloop by 90° relative to its position shown in FIG. 1, and inserting the retaining lip 130 and ball 110 of the pivot post from below (indicated by the letter B in FIG. 2). This allows the retaining lip 130 to enter the opening defined by the socket 112 with the rounded short ends 132 to face the two lower walls 118 and enter the socket opening without being obstructed by the overhanging higher walls 116. The pivot post 102 is then rotated by 90° causing the rounded short ends 132 (which extend laterally from the pivotal axis of the earloop to a greater extent than the parallel long ends 134) to ride up on the convex upper surface 120 of the higher walls 116. This pulls the ball 110 fully into the socket 112. It will be appreciated that the elastomeric nature of the earloop material flexes to allow the ball 110 to enter into the complementarily shaped concave housing of the socket 112. Thus the ball 110 is retained in the socket 112 both by the concave inner surface of the higher walls 116 which extend partly around the ball's upper and lower ends and, as an extra safeguard by the retaining lip 130, while the short ends 132 of the lip extend at least partially over the top surfaces 120 of the higher walls 116. This assembled configuration is best shown in FIG. 3 which shows the short ends 132 of the retaining lip extending over the convex upper surface 120 of the higher walls. The ball and socket arrangement allows the ball 110 to rotate within the socket about its axis 150 and pivot readily about an axis C in directions indicated by the letters D. It will be appreciated that pivoting in other directions other than directly in directions C is permitted to a certain degree as defined by the convex upper surface 120 of the higher wall 116.

Thus the present invention provides for a highly maneuverable earloop arrangement making use of only a single earloop element and a single pivot post element. It will be appreciated that the above embodiment is by way of illustration only and is not intended to limit the invention as defined by the claims. For instance, the ball arrangement could, instead be provided on the earloop, with the socket formed on the housing. Also, it is not necessary that both the ball and socket be made of an elastomeric material. Only one of the two elements need to be deformable to allow the two elements to be assembled.

What is claimed is:

1. An earloop and pivot post arrangement for an ear-mounted audio device, comprising
an earloop made from a single piece of material and
a pivot post made from a single piece of material, one of the earloop and pivot post including a ball arrangement and the other of the earloop and pivot post including a socket shaped to complementarily receive a spherical portion of the ball arrangement;
wherein the ball arrangement includes a ball with a lip extending tangentially from the ball.

2. The arrangement of claim 1, wherein at least one of the socket and ball arrangement is made from an elastomeric material.

3. The arrangement of claim 1, wherein the lip has a substantially rectangular shape with the short sides being rounded.

4. The arrangement of claim 1, wherein the socket is defined by a pair of opposite low side walls with concave inner surface and a pair of opposite high side walls with concave inner surface, the high walls being higher than the low walls and defining a convex upper surface.

5. The arrangement of claim 4 wherein the inner surfaces of the low and high side walls are shaped to complementarily receive the convex outer surface of the ball, thus requiring elastomeric deformation of the ball or socket in order for the ball to be received in the socket.

6. The arrangement of claim 5, wherein the height of the high side walls is chosen so that the low ends of the convex surface extend to below the lip height of the ball arrangement when the ball arrangement is partially inserted into the socket from below.

7. The arrangement of claim 6, wherein the height of the apex of the convex upper surface of the high side walls is chosen to engage with the lower surface of the lip when the ball arrangement is fully received in the socket.

8. An earloop for an ear-mounted audio device, comprising
a loop and a socket shaped to receive a spherical portion of a ball arrangement or ball arrangement at one end of the loop, the loop and socket or ball arrangement being made of a single piece of material, the ball arrangement further including a ball with a lip extending tangentially from the ball.

9. The earloop of claim 8, wherein the socket or ball arrangement are made of an elastomeric material.

10. The earloop of claim 8, wherein the lip has a substantially rectangular shape with the short sides being rounded.

11. The earloop of claim 8, wherein the socket is defined by a pair of opposite low side walls with concave inner surface and a pair of opposite high side walls with concave inner surface, the high walls being higher than the low walls and defining a convex upper surface.

12. The earloop of claim 11, wherein the inner surfaces of the low and high side walls are shaped to complementarily receive the convex outer surface of a ball.

13. An ear-mounted audio device, comprising
a housing having a pivot post extending from the housing, the pivot post including socket or ball arrangement, the socket or ball arrangement being made of a single piece of material, wherein the socket is shaped to receive a spherical portion of a ball arrangement and wherein the ball arrangement includes a ball with a lip extending tangentially from the ball.

14. The ear-mounted audio device of claim 13, wherein the socket or ball arrangement are made of an elastomeric material.

15. The ear-mounted audio device of claim 13, wherein the lip has a substantially rectangular shape with the short sides being rounded.

16. The ear-mounted audio device of claim 13, wherein the socket is defined by a pair of opposite low side walls with concave inner surface and a pair of opposite high side walls with concave inner surface, the high walls being higher than the low walls and defining a convex upper surface.

17. The ear-mounted audio device of claim 16, wherein the inner surfaces of the low and high side walls are shaped to complementarily receive the convex outer surface of a ball.

* * * * *